Aug. 5, 1924.
B. BRADY
CHILD'S VEHICLE
Filed Jan. 2, 1924
1,503,878
2 Sheets-Sheet 1
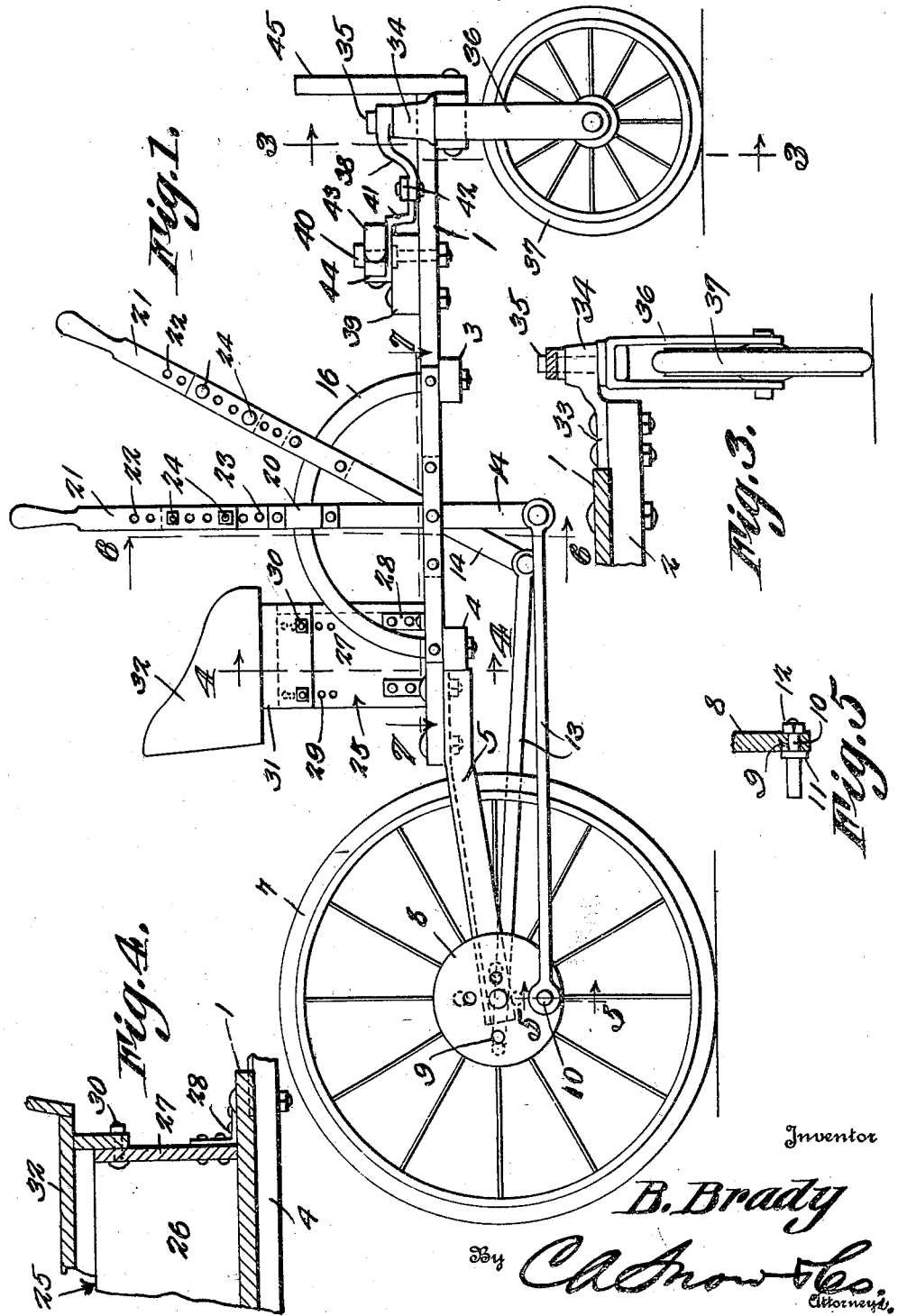
Inventor
B. Brady Aug. 5, 1924.  1,503,878
B. BRADY
CHILD'S VEHICLE
Filed Jan. 2, 1924  2 Sheets-Sheet 2
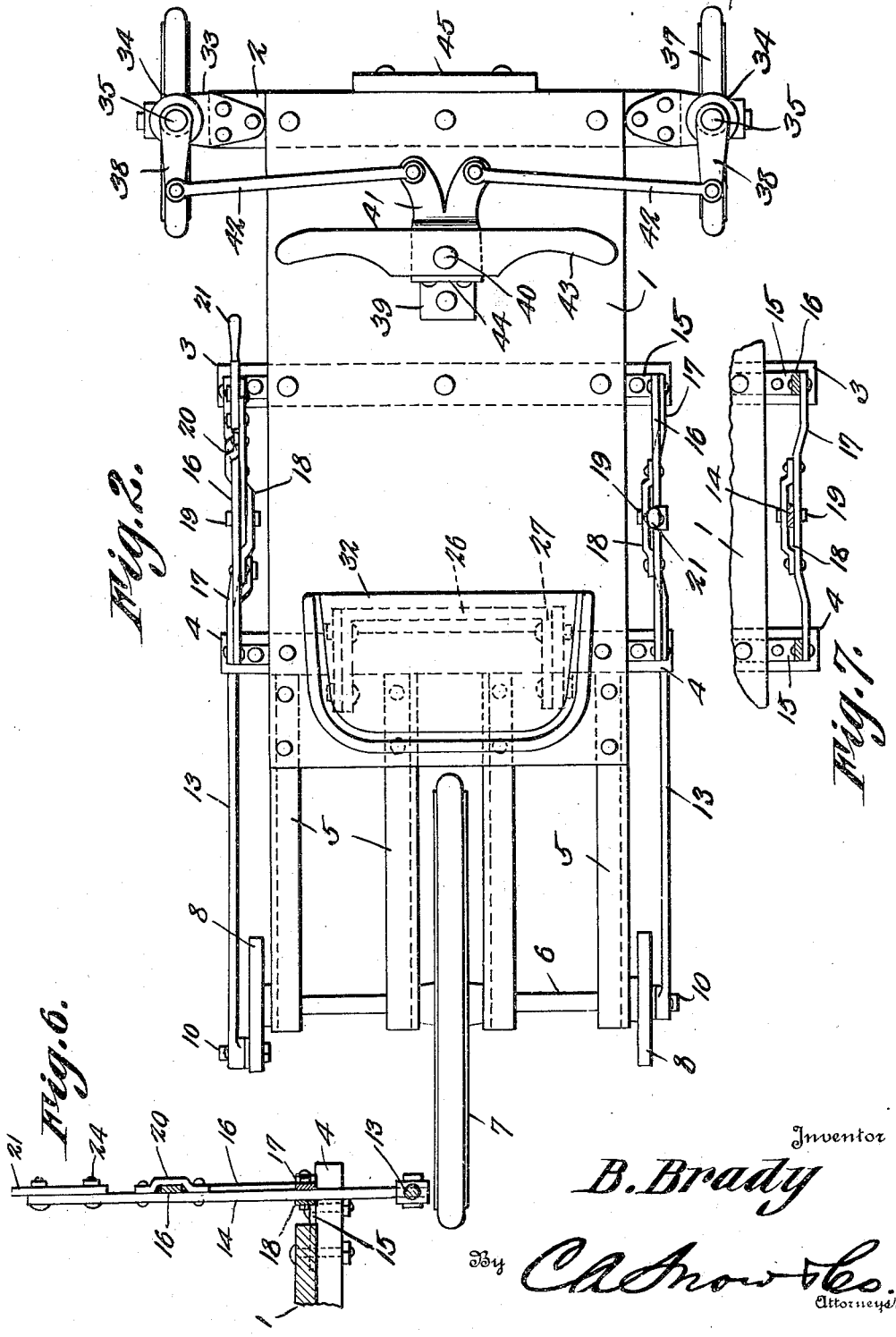
Inventor
B. Brady
By C.A.Snow&Co.
Attorneys.

Patented Aug. 5, 1924.

1,503,878

UNITED STATES PATENT OFFICE.

BYRON BRADY, OF DUNMORE, PENNSYLVANIA.

CHILD'S VEHICLE.

Application filed January 2, 1924. Serial No. 684,055.

*To all whom it may concern:*

Be it known that I, BYRON BRADY, a citizen of the United States, residing at Dunmore, in the county of Lackawanna and State of Pennsylvania, have invented a new and useful Child's Vehicle, of which the following is a specification.

This invention relates to a vehicle for use by children, one of the objects being to provide a structure of this character that can be adjusted readily to suit children of different sizes, adjustable hand operated means being employed for propelling the vehicle.

A further object is to provide a structure utilizing a pair of front wheels mounted in a novel manner and adapted to be shifted by a foot lever for the purpose of guiding the vehicle.

Another object is to provide a structure of this character utilizing a single rear wheel employed for propelling purposes, the driving mechanism being adjustably connected to this wheel so that the power required for operating it can be varied.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is a side elevation of the vehicle.

Fig. 2 is a plan view thereof.

Fig. 3 is a section on line 3—3, Fig. 1.

Fig. 4 is a section on line 4—4, Fig. 1.

Fig. 5 is a section on line 5—5, Fig. 1.

Fig. 6 is a section on line 6—6, Fig. 1.

Fig. 7 is a section on line 7—7, Fig. 1.

Referring to the figures by characters of reference 1 designates the platform of the vehicle, the same being mounted at its front end on a transverse reinforcing strip or bolster 2 while extending transversely beneath and secured to this platform at points between its ends are reinforcing strips 3 and 4 the ends of which project laterally beyond the platform. Secured to the bottom of the rear portion of the platform and abutting against the strip 4 are angle strips 5, two of these strips being located in line with the sides of the platform while two of them are located close to but at opposite sides of the longitudinal center of the vehicle. These preferably are inclined downwardly from the platform as shown particularly in Fig. 1 and extending through the rear end portions thereof is a rotatable axle 6 projecting laterally beyond the sides of the vehicle. Secured to the middle portion of the axle so as to rotate therewith is a rear supporting wheel 7 and secured to the projecting end portions of the axle are disks 8. As shown in Fig. 1 each disk has openings 9 extending therethrough, said openings being located at different distances from the center of the disk and being preferably arranged ninety degrees apart. A wrist pin 10 is adapted to be seated in any one of these openings and has a collar 11 for engagement with one face of the disk. A nut 12 is also provided for engaging the wrist pin to hold it in place with the collar bearing against the disk. Mounted on each wrist pin is a drive rod or pitman 13 and these pitmen are pivotally connected to the lower ends of hand levers 14 located at oposite sides of the platform 1.

Secured to the projecting ends of the cross strips 3 and 4 are the feet 15 of arcuate guides 16, one of these guides being located adjacent each lever and parallel with its plane of movement and also concentric with its axis of movement. A cross strip 17 is secured to the lower end portions of each arcuate guide and has a guide strap 18 attached to it as shown in Fig. 7. One of the levers 14 extends between each cross strip 17 and its strap 18 and is pivotally connected to them as shown at 19. A strap 20 is attached to each lever 14 and straddles the adjacent arcuate guide 16 so as to slide thereon as shown in Fig. 6.

Adjustably connected to the upper end of each lever 14 is a handle 21 having a longitudinal series of apertures 22. Another longitudinal series of apertures 23 is formed in the lever 14 and bolts 24 are adapted to be inserted into registering openings in each lever and its handle so that it is thus possible for each handle to be adjusted longitudinally relative to its lever.

Erected on the rear portion of the platform 1 is a supporting structure 25 made up preferably of a front wall 26 and side walls 27, this structure being attached to the platform by means of brackets 28. Parallel series of openings 29 are formed in each side wall 27 and are adapted to receive bolts 30 extending through plates or side pieces 31 extending downwardly from the bottom of a seat 32. Obviously, therefore, the seat can be adjusted to different heights, thereby to accommodate persons of different sizes.

Secured to the ends of the cross strip or bolster 2 are brackets 33 each of which has a sleeve 34 at its outer end in which is journaled a spindle 35 extending upwardly from a fork 36. A front wheel 37 is journaled in each fork and secured to and extending rearwardly from each spindle 35 is an arm 38.

A block 39 is secured upon the platform 1 in front of the seat 32 and has a pivot bolt 40 extending therethrough and through the platform. A forked plate 41 is pivotally mounted on this bolt and bears downwardly on the block, the forward or forked end of this plate being offset downwardly and pivotally connected to rods 42 that are in turn pivotally attached to the arms 38. A foot lever 43 is secured to the plate 41 and is adapted to swing on the bolt 40, one end of the plate being provided with a flange 44 projecting back of and attached to the lever as shown particularly in Fig. 1.

It will be noted that in the structure illustrated one of the wrist pins 10 is ninety degrees in advance of the other wrist pin 10. This is a preferred arrangement as it prevents the vehicle from becoming locked on a dead center.

The seat 32 and the handles 21 are adapted to be adjusted to the size of the person using the same and the wrist pins 10 are placed in the proper openings 9 so that the power necessary to propel the vehicle can be regulated. By oscillating the levers the vehicle will be driven forwardly or backwardly and the driver can, by manipulating lever 43, readily steer the vehicle as will be obvious.

If desired a dash board 45 can be secured to the front end of the platform and to the bolster 2 as shown.

What is claimed is:

1. A vehicle of the class described including a platform, spaced rearwardly extending side and intermediate strips connected to the platform, an axle mounted for rotation within said strips, a supporting wheel secured to the axle and mounted between the intermediate strips, hand levers pivotally mounted at the sides of the platform, and adjustable drive connections between the levers and the axle.

2. A vehicle of the class described including a platform, spaced rearwardly extending side and intermediate strips connected to the platform, an axle mounted for rotation within said strips, a supporting wheel secured to the axle and mounted between the intermediate strips, hand levers pivotally mounted at the sides of the platform, disks secured to the end portions of the axle and rotatable therewith, drive rods connected to the levers, and adjustable connections between the drive rods and the respective disks for varying the leverage through the disks upon the axle.

3. A vehicle of the class described including a platform, spaced rearwardly extending side and intermediate strips extending rearwardly from the platform, an axle mounted for rotation within the strips, a supporting wheel secured to the axle between the intermediate strips, disks secured to the ends of the axle, each disk having openings at different distances from the axle, a wrist pin detachably mounted in any one of the openings, drive levers, and driving connections between the levers and the respective wrist pins.

4. A vehicle of the class described including a platform, a rear supporting wheel, a rotatable axle connected thereto, disks secured to the end portions of the axle and rotatable therewith, operating levers at the respective sides of the platform, drive rods connected to the levers, adjustable connections between the rods and the respective disks for varying the throw of the levers, and handles adjustably connected to the levers.

In testimony that I claim the foregoing as my own, I have hereto affixed my signature in the presence of two witnesses.

BYRON BRADY.

Witnesses:
CHARLES SOMERS,
MICHAEL J. O'HORA.